(12) United States Patent
Canard et al.

(10) Patent No.: US 10,050,777 B2
(45) Date of Patent: Aug. 14, 2018

(54) METHOD OF UPDATING A FILE TREE STORED ON A STORAGE SERVER

(71) Applicant: Orange, Paris (FR)

(72) Inventors: Sébastien Canard, Caen (FR); Julien Devigne, Caen (FR)

(73) Assignee: ORANGE, Paris (FR)

( * ) Notice: Subject to any disclaimer, the term of this patent is extended or adjusted under 35 U.S.C. 154(b) by 257 days.

(21) Appl. No.: 15/100,548

(22) PCT Filed: Nov. 12, 2014

(86) PCT No.: PCT/FR2014/052884
§ 371 (c)(1),
(2) Date: Jun. 2, 2016

(87) PCT Pub. No.: WO2015/082791
PCT Pub. Date: Jun. 11, 2015

(65) Prior Publication Data
US 2016/0301525 A1 Oct. 13, 2016

(30) Foreign Application Priority Data
Dec. 2, 2013 (FR) ..................... 13 61964

(51) Int. Cl.
*H04L 29/00* (2006.01)
*H04L 9/06* (2006.01)
*H04L 9/08* (2006.01)
*H04L 9/30* (2006.01)

(52) U.S. Cl.
CPC .......... *H04L 9/0618* (2013.01); *H04L 9/0643* (2013.01); *H04L 9/0825* (2013.01); *H04L 9/0866* (2013.01); *H04L 9/0894* (2013.01); *H04L 9/3013* (2013.01); *H04L 2209/60* (2013.01); *H04L 2209/76* (2013.01)

(58) Field of Classification Search
CPC .... H04L 9/0618; H04L 9/0643; H04L 9/0825
USPC .......................................................... 380/30
See application file for complete search history.

(56) References Cited

U.S. PATENT DOCUMENTS

2008/0059787 A1 * 3/2008 Hohenberger ........ H04L 9/3013
713/153

OTHER PUBLICATIONS

Guiseppe Ateniese, Kevin Fu, Metthew Green, Susan Hohenberger/ Improved Proxy Re-Encryption Schemed with Applications to Secure Distributed Storage/ 2005/ pp. 1-25.*
Ateniese et al. Feb. 2, 2006. "Improved proxy re-encryption schemes with applications to secure distributed storage" ACM Transactions on Information and System Security, vol. 9, No. 1, 30 pages.

(Continued)

*Primary Examiner* — Jeffrey Pwu
*Assistant Examiner* — Michael D Anderson
(74) *Attorney, Agent, or Firm* — Knobbe, Martens, Olson & Bear, LLP

(57) ABSTRACT

One embodiment relates to a method of updating, by an electronic device of a first user of a tree of data files and/or folders of the first user stored in a storage server configured to implement a re-encryption mechanism, this tree comprising at least one target folder that the first user has authorized a second user to access by providing the storage server with a re-encryption key for this target folder from the first user to the second user.

18 Claims, 3 Drawing Sheets

(56) References Cited

OTHER PUBLICATIONS

Devigne, Julien. 2013. Protocoles de re-chiffrement pour le stockage de données. Retrieved from the Internet on Mar. 16, 2015, URL:https://tel.archives-ouvertes.fr/tel-01081377/document, 162 pages.
Fang et al. 2011. Interactive conditional proxy re-encryption with fine grain policy. *The Journal of Systems and Software*, 84(12):2293-2302.
Lin et al. 2012. A Secure Fine-Grained Access Control Mechanism for Networked Storage Systems. *Software Security and Reliability (SERE), 2012 IEEE Sixth International Conference*, pp. 225-234.
Weinrib et al. Oct. 1996. IRTF Research Group Guidelines and Procedures. RFC 2014, Best Current Practice, 13 pages.
International Search Report dated Mar. 26, 2015 for International Application No. PCT/FR2014/052884 filed Nov. 12, 2014, 7 pages.
Written Opinion dated Mar. 26, 2015 for International Application No. PCT/FR2014/052884 filed Nov. 12, 2014, 6 pages.

\* cited by examiner

METHOD OF UPDATING A FILE TREE STORED ON A STORAGE SERVER

RELATED APPLICATIONS

This application is the U.S. National Phase of Application No. PCT/FR2014/052884 entitled "METHOD OF UPDATING A FILE TREE STORED ON A STORAGE SERVER" filed Nov. 12, 2014, which designated the United States, and which claims the benefit of French Application No. 1361964 filed Dec. 2, 2013.

BACKGROUND OF THE INVENTION

The invention relates to the general field of telecommunications.

It more specifically concerns the field of data protection and specifically the management of access rights to personal and/or confidential data of a user stored on a storage server implementing an encryption primitive.

The invention thus has a preferred but nonlimiting application in the context of dematerialized computing, also called cloud computing, for the purpose of providing a remote space for storing data (e.g. personal and/or confidential data) that is secure, can be accessed by several users and offers dynamic management of access rights that can vary according to the data stored.

Today there are so-called "proxy re-encryption" solutions allowing a storage server to store, for a single user, personal and/or confidential data of this user in an encrypted form. These data are for example encrypted using a public-key encryption algorithm using the public key of the user. The server has no plaintext knowledge of the data thus stored, preserving their security and confidentiality. The storage server can however give access to this data to third parties authorized by the user without the latter having to disclose his private encryption key, and although this data was not initially addressed to these third parties.

Such a solution is for example described in the document by G. Ateniese et al. titled "Improved proxy re-encryption schemes with applications to secure distributed storage" ACM Transactions on Information and System Security, vol. 9, n°1, February 2006.

According to this solution, a user U1 wishing to store data on the storage server, encrypts this data using his public encryption key PK1, and provides the storage server with the data thus encrypted. The user U1 also generates and transmits to the storage server a so-called re-encryption or transition key for the use of the user U2, giving a user U2 right of access to this data. The storage server uses this re-encryption key to reencrypt the encrypted data provided by the user U1 so that the user U2 can access it using his private key SK2.

In this way, the storage server never has access to the plaintext data of the user U1: this is because the re-encryption carried out by the storage server does not require any prior decryption of the data encrypted by the user U1. This solution is therefore secure.

However, this solution has the drawback that the user U1 who trusts the user U2 can effectively give him access rights for his data stored on the storage server, but cannot limit these access rights to only a selection of his data (for example a specific data file in a folder or directory.) This solution offers sharing in "all or nothing" mode and therefore does not allow for finetuning of access rights to the data of the user U1 stored on the storage server.

To palliate this drawback, Q. Tang describes a solution of conditional re-encryption (or "conditional proxy re-encryption") wherein the data of the user U1 is no longer only encrypted for the user U1 but also for an access condition C1. The user U1 can still access his data stored on the storage server using his private key SK1. On the other hand, the access condition C1 determines, among the third parties trusted by the user U1, those who will be capable of accessing these data.

Thus if the user U1 wishes to offer access rights to data pertaining to the condition C1, he creates a key for re-encryption from himself to the user U2 for the access condition C1. This re-encryption key allows the storage server to convert the data encrypted for the user U1 and the condition C1 into data encrypted for the user U2. The user U2 can thus access the data associated with the access condition C1 on the storage server using his private key SK2.

If data pertains to a different access condition to C1 or belongs to a different user to U1, this re-encryption key pertaining to the user U1 and the access condition C1 will not allow the storage server to convert the data into data encrypted for the user U2 and decryptable by the latter using his private key SK2.

This solution is however not very flexible in practice.

Specifically, if one considers the example of a data file, once it is encrypted for an access condition C1, it is not possible to modify the latter, even at the request of the user U1. It is then necessary for the user U1 to intervene, retrieve the plaintext data file and restart the process of encryption and storage for the modified access condition.

Moreover, a data file is rarely isolated and is often included in a tree of files and/or directories. This tree can be more or less large (i.e. comprise more or fewer levels) and contain several sets of files in different directories, subdirectories etc.

It can be desirable for the user U1 to be able to apply different access conditions to different parts of this tree. But, if a directory of such a tree pertains to an access condition C1 (and therefore all the files it contains), it is not possible, with the solution proposed by Tang, to make a file contained in this directory also pertain to an access condition C2.

Furthermore, this solution does not make it possible to easily manage the updating of the tree of files, for example by inserting new files and/or directories into the tree, or by moving and/or copying one file and/or directory to another directory.

SUBJECT AND SUMMARY OF THE INVENTION

The invention notably makes it possible to palliate these drawbacks by proposing a method of updating, by an electronic device of a first user, of a tree of data files and/or folders of the first user stored in a storage server able to implement a re-encryption mechanism, this tree comprising at least one target folder that the first user has authorized a second user to access by providing the storage server with a re-encryption key for this target folder from the first user to the second user. The method according to the invention comprises, for each inclusion of an element in, or movement of an element into this target folder, this element being a data file or a folder:

a step of generation of a re-encryption key for the first user from the element to a folder belonging to a hierarchical level directly above in the tree in which the element is included, this re-encryption key being generated from a secret identifier of the element, a secret identifier assigned to the folder of the hierarchical level directly above, and private and public keys of the first user;

if the element is a data file, a step of encryption of the element using a public key of the first user and the secret identifier assigned to the element; and a step of updating of the tree comprising the providing of the storage server with the re-encryption key generated for the first user and, if the element is a data file, with the cipher of this element.

Correlatively, the invention also relates to an electronic device of a first user able to update a tree of data files and/or folders of the first user stored in a storage server able to implement a re-encryption mechanism, this tree comprising at least one target folder that the first user has authorized a second user to access by providing the storage server with a re-encryption key for this target folder from the first user to the second user. This electronic device of the first user includes modules activated for each inclusion of an element in or movement of an element into this target folder, this element being a data file or a folder, these modules comprising:

a module for generating a re-encryption key for the first user from the element to a folder belonging to a hierarchical level directly above in the tree in which the element is included, this re-encryption key being generated from a secret identifier of the element, a secret identifier assigned to the folder of the hierarchical level directly above it, and private and public keys of the first user;

a module for encrypting the element, activated if the element is a data file and able to use a public key of the first user and the secret identifier assigned to the element; and a module for updating the tree able to provide the storage server with the re-encryption key generated for the first user and, if the element is a data file, the cipher of this element.

The term "target folder" is understood to mean a folder of a first user that the latter has authorized a second user to access. No limitation is attached to the position of the target folder in the tree of files and folders of the first user. In particular, the target folder is not necessarily located at the root of the tree, but can itself be included in another folder of this tree.

In the same way, the file and/or folder included in or moved into the target folder considered in the invention is not necessarily directly included in the target folder, but it can be included in or moved into a file existing "beneath" the target folder. Several parent folders can separate the included or moved file and/or folder from the target folder strictly speaking.

Moreover, it should be noted that the storage server here refers in the wider sense to one or more separate entities participating in the operation of secure storage of the data of the first user. The functions of storage strictly speaking and re-encryption implemented by the storage server are not necessarily implemented by a single hardware device but can take the form of several separate software or hardware entities (e.g. by several servers) which for the sake of simplicity all come under the general name of "storage server" in the description.

The invention thus relies on the implementation at storage server level of a conditional re-encryption server primitive. However, in accordance with the invention, to allow fine-tuning of the access rights given by the first user to a second user on files and/or folders of a tree of files and folders, a unique access condition is allocated by the first user to each file and/or folder of the tree. Each access condition thus uniquely identifies the element (file or folder) to which it is related.

In accordance with the invention, this access condition is a secret identifier of the element. The secret identifier can be determined for example from a public identifier of this element and a private key of the first user. More specifically, the secret identifier of the element can be determined by applying a hash function parameterized by the private key of the first user to the public identifier of the element. The same goes for the secret identifier of each folder of the tree containing the element.

Given that each file and each folder of the tree have a different access condition from that of the folder in which they are included, the invention proposes a mechanism for re-encrypting (or reconditioning) each file and folder gradually as they are inserted into the tree, making it possible to guarantee that the second user can properly access all the data of the tree that he is authorized to access by the first user. This re-encryption mechanism is divided into two phases:

a first phase of so-called "vertical" reconditioning or re-encryption during which re-encryption keys are created by the electronic device of the first user in order to change the access condition pertaining to an element of a hierarchical level of the tree into an access condition pertaining to a folder of the hierarchical level directly above containing this element. These re encryption keys are created for all the levels of the tree separating the element under consideration from the target folder; and a second phase of so-called "horizontal" re-encryption also commonly known as the re encryption phase, during which the electronic device of the first user creates a re-encryption key pertaining to the target folder from the first user to the second user. This re-encryption key is intended to allow the second user to access all the contents of the target folder.

This reconditioning mechanism in two phases makes it possible to construct a tree of re-encryption keys which is the image of the tree of files and/or folders stored at the storage server. In other words, with each inclusion of a file and/or a new folder in the tree or with every movement of a file and/or a folder from one folder of the tree to another, a re-encryption key pertaining to this file or this folder is created so as to bring the condition pertaining to this file or this folder toward a condition pertaining to a folder of a hierarchical level directly above, and this occurs until a condition is arrived at step-by-step on the target folder that the first user has authorized the second user to access.

Furthermore, a cipher is generated for each new file inserted into the target folder. Note that when the first user inserts a folder comprising several files into the target folder, the invention is applied first to the folder (with the generation of a re-encryption key of this folder to the folder belonging to the hierarchical level directly above), then to each of the files contained in this folder (with the generation of a cipher of each file and a re-encryption key for each file to the folder in which this file is directly included.)

The invention thus guarantees a solution for the secure storage of a tree of the files and folders of the first user (the cipher of each file provided to the storage server is specifically intended for the first user uniquely and, to be decoded, requires knowledge of his secret key), while offering the possibility of having finetuning of the access rights to this tree.

In a particular embodiment, the step of encryption of the element comprises the application of a public-key encryption algorithm or a hybrid encryption algorithm relying on a public-key encryption algorithm and a secret-key encryption algorithm. In particular, when the encryption step comprises the application of a hybrid encryption algorithm:

the secret-key encryption algorithm can be applied to the element using a secret key generated for this element; and the public-key encryption algorithm can be applied to the secret key generated for the element using a key derived from the public key of the first user and the secret identifier of the element.

The use of a hybrid encryption algorithm advantageously makes it possible to manage large files and/or folders more easily, making use on the one hand of the functionality of public-key (or asymmetric) encryption, and on the other hand of the efficiency of secret key (or symmetric) encryption.

In a particular embodiment, the re-encryption key for the first user from the element to the folder of the hierarchical level directly above is generated by applying a public-key encryption algorithm to a message obtained from the private identifier of the element, and from a temporary key derived from the private key of the first user, using the public key of the first user and the secret identifier of the folder of the hierarchical level directly above.

This embodiment makes it possible to simplify the re-encryption carried out at storage server level. As described in more detail later, this re-encryption is based on the multiple re encryption keys generated in the vertical reconditioning phase and transmitted to the storage server. It is thus composed of a plurality of re-encryptions implemented iteratively, each re-encryption using a separate re-encryption key. In this embodiment, a re-encryption put through a given iteration uses the cipher generated in the previous iteration only. It is not necessary to take into account all the ciphers previously generated.

In another particular embodiment, the re-encryption key from the first user to the second user is generated by applying a public-key encryption algorithm to a message obtained from a secret identifier assigned to the target folder and from the private key of the first user, using the public key of the second user.

In this way it is possible to ensure that only the second user can access the target folder of the first user by using his private key.

The re-encryption mechanism proposed by the invention is based not only on the construction (or updating) of a tree of re-encryption keys that is an image of the file (and/or folder) tree of the first user stored at storage server level, but also on the re-encryption by the storage server of the ciphers transmitted by the device of the first user, and on the decryption by the second user's electronic device of the elements re-encrypted by the storage server.

Thus, according to another aspect, the invention also relates to a method of re-encryption, by a storage server, of a tree of data files and/or folders of a first user, this tree comprising at least one target folder that the first user has authorized a second user to access, the re-encryption method comprising, for each data file included in or moved into the target folder for which a cipher has been provided to said storage server:

a first step of re-encryption resulting in a first cipher of the file and comprising:

the re-encryption of the cipher of the file provided to the storage server using a re-encryption key for the first user from this file to a folder of a hierarchical level directly above in the tree in which the file is included; and for each hierarchical level k of the tree, from the hierarchical level directly above it up to a hierarchical level directly below the hierarchical level of the target folder, a re-encryption resulting in a cipher for the hierarchical level k, of a cipher obtained for the hierarchical level k−1, this re-encryption being implemented using a re-encryption key for the first user from a folder of the hierarchical level k to a folder of the hierarchical level k+1 in which the file is included;

the first cipher of the file corresponding to the cipher obtained for the hierarchical level directly below the hierarchical level of the target folder; and a second step of re-encryption resulting in a second cipher of the file comprising a re-encryption of the first cipher with a re-encryption key for the target folder from the first user to the second user.

Correlatively, the invention also concerns a storage server of a tree of data files and/or folders of a first user, comprising at least one target folder that the first user has authorized a second user to access, the storage server comprising a first and a second re-encryption modules activated for each data file included in or moved into the target folder for which a cipher has been provided to the storage server, and wherein:

the first re-encryption module is able to generate a first cipher of the file by implementing:

a re-encryption of the cipher of the file provided to the storage server using a re-encryption key for the first user from this file to a folder of a hierarchical level directly above in the tree in which the file is included; and for each hierarchical level k of the tree, from this hierarchical level directly above it up to a hierarchical level directly below the hierarchical level of the target folder, a re-encryption resulting in a cipher for the hierarchical level k, of a cipher obtained for the hierarchical level k−1, this re-encryption being implemented using a re-encryption key for the first user from a folder of the hierarchical level k to a folder of the hierarchical level k+1 in which the file is included;

the first cipher of the file corresponding to the cipher obtained for the hierarchical level directly below the hierarchical level of the target folder;

the second re-encryption module is able to generate a second cipher of the file by implementing a re-encryption of the first cipher with a re-encryption key for the target folder from the first user to the second user.

In other words, the storage server re-encrypts each file of the file tree of the first user by going up the tree using the re-encryption keys transmitted by the device of the first user, then performs a final re-encryption to allow the second user to access the file thus re-encrypted.

According to yet another aspect, the invention relates to a method for decryption of a cipher of a data file of a tree of data files and/or folders of a first user, this tree comprising at least one target folder containing the file and which the first user has authorized a second user to access, this decryption method being intended to be implemented by an electronic device of the second user, said cipher of the file having been provided to said electronic device following the execution by a storage server of a method of re-encryption according to the invention, this decryption method comprising a step of decryption of this cipher using a private key of the second user.

Correlatively, the invention also concerns an electronic device comprising a module for decrypting a cipher of data file of a tree of data files and/or folders of a first user, this tree comprising at least one target folder containing the file and which the first user has authorized the second user to access, this cipher having been provided to the electronic device by a storage server according to the invention, the decryption module being able to decrypt this cipher using a private key of the second user.

According to yet another aspect, the invention relates to a system comprising:
- an electronic device of a first user according to the invention;
- a storage server according to the invention of a tree of data files and/or folders of a first user, comprising at least one target folder which the first user has authorized a second user to access; and
- an electronic device of the second user according to the invention.

The re-encryption method, the storage server, the decryption method, the electronic device of the second user and the system according to the invention benefit from the same aforementioned advantages as the updating method and the electronic device of the first user.

In a particular embodiment, the different steps of the updating method, and/or the re-encryption method and/or the decryption method are determined by computer program instructions.

Consequently, the invention also relates to a computer program on an information storage medium, this program being capable of being implemented in an electronic device or more generally in a computer, this program including instructions suitable for the implementation of the steps of an updating method as described above.

The invention also relates to a computer program on an information storage medium, this program being capable of being implemented in a storage server or more generally in a computer, this program including instructions suitable for the implementation of the steps of a re-encryption method as described above.

The invention also relates to a computer program on an information storage medium, this program being capable of being implemented in an electronic device or more generally in a computer, this program including instructions suitable for the implementation of the steps of a decryption method as described above.

Each of these programs can use any programming language, and be in the form of source code, object code, intermediate code between source code and object code, such as in a partially compiled form, or in any other desirable form.

The invention also relates to an information storage medium readable by a computer, and including the instructions of a computer program as mentioned above.

The information storage medium can be any entity or device capable of storing the program. For example, the storage medium can include a storage means, such as a ROM, for example a CD-ROM or a microelectronic circuit ROM, or else a magnetic storage means, for example a diskette (floppy disk) or a hard disk.

Moreover, the information storage medium can be a transmissible medium such as an electrical or optical signal, which can be conveyed via an electrical or optical cable, by radio or by other means. The program according to the invention can in particular be downloaded over a network of Internet type.

Alternatively, the information storage medium can be an integrated circuit in which the program is incorporated, the circuit being suitable for executing, or being used in the execution of the method in question.

In other embodiments it is can also be envisioned that the updating method, the re-encryption method, the decryption method, the electronic devices and the storage server according to the invention have in combination all or part of the aforementioned features.

BRIEF DESCRIPTION OF THE DRAWINGS

Other features and advantages of the present invention will become apparent from the description given below, with reference to the appended drawings which illustrate an exemplary embodiment thereof, without being limiting. In the figures.

DETAILED DESCRIPTION OF THE INVENTION

Figure 1:
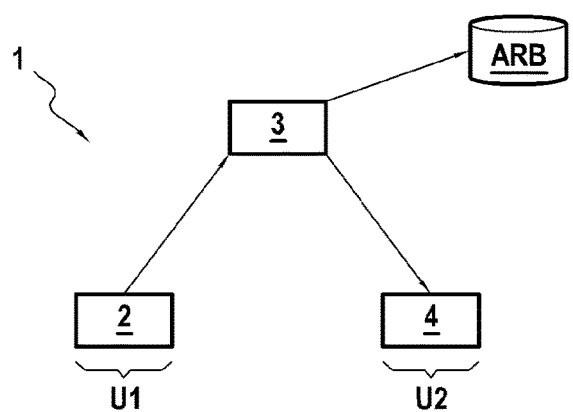
FIG. 1 schematically represents a system in accordance with the invention in a particular embodiment.

FIG. 1 represents, in its environment, a system 1 in accordance with the invention, in a particular embodiment. This system 1 comprises:
- an electronic device 2 belonging to a first user U1 and in accordance with the invention;
- a storage server 3 in accordance with the invention, in which the user U1 has stored, for example via his electronic device 2, confidential and/or personal data in the form of a tree ARB of data files and/or folders (also called directories.) To ensure the confidentiality of the data of the user U1, these are stored on the storage server 3 in an encrypted form; and
- an electronic device 4 belonging to a second user U2 and in accordance with the invention.

No limitation is attached to the nature strictly speaking of the electronic devices 2 and 4 of the users U1 and U2. These can for example be computers, mobile terminals, electronic tablets etc.

It is supposed here that the user U1 has authorized the user U2 to access from the storage server 3 at least one folder DF from the tree ARB (target folder in the sense of the invention) containing confidential data of the user U1. As mentioned previously, no limitation is attached to the position of the target folder DF in the tree ARB of files and folders of the first user stored by the storage server 3. In particular, the target folder is not necessarily located at the root of this tree, but can itself be included in another folder thereof.

The access right granted by the user U1 allows the user U2 to access all the files and folders (i.e. subfolders) included in the folder DF, in other words, belonging in the tree ARB to hierarchical levels below the hierarchical level of the folder DF.

To allow this access while also preserving the security of the data of the user U1, the storage server 3 is equipped, in accordance with the invention, with a primitive (i.e. a module) of a conditional proxy reregistration server.

Figure 2:
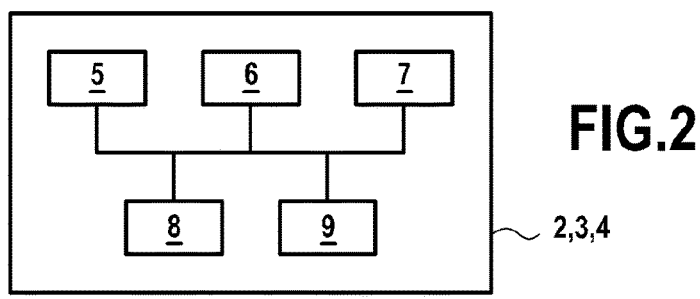
FIG. 2 illustrates the hardware architecture of electronic devices and of a storage server in accordance with the invention in a particular embodiment.

In the embodiment described here, the electronic devices 2 and 4 and the storage server 3 possess the hardware architecture of a computer, as schematically illustrated in FIG. 2.

They specifically each comprise a processor 5, a read-only memory 6, a random access memory 7, a nonvolatile memory 8 and communication means 9 allowing them to communicate with one another. These communication means 9 for example comprise means for communicating over a telecommunications network. No limitation is attached to the nature of this network; it can be either a wired or wireless network, a fixed or mobile network, etc.

The read-only memory 6 of the electronic device 2 constitutes a storage medium according to the invention, readable by the processor and on which a computer program in accordance with the invention is stored, including instructions for the execution of the steps of the updating method in accordance with the invention, detailed below with reference to FIG. 4.

This computer program defines, in a corresponding manner, software and functional modules of the electronic device 2 which are able to implement the steps of the updating method, such as in particular a module for encrypting data, a module for generating re-encryption keys and a module for updating the tree ARB relying on the communication means 9 of the electronic device 2.

In the same way, the read-only memory 6 of the storage server 3 constitutes a storage medium according to the invention, readable by the processor and on which a computer program in accordance with the invention is stored, including instructions for the execution of the steps of the re-encryption method in accordance with the invention, detailed below with reference to FIG. 6.

This computer program defines, in a corresponding manner, software and functional modules of the storage server 3 which are able to implement the steps of the re-encryption method, such as in particular a module for re-encrypting encrypted data and a reception module relying on the communication means 9 of the storage server 3.

Similarly, the read-only memory 6 of the electronic device 4 constitutes a storage medium according to the invention, readable by the processor and on which a computer program in accordance with the invention is stored, including instructions for the execution of the steps of the decryption method in accordance with the invention, detailed below with reference to FIG. 7.

This computer program defines, in a corresponding manner, software and functional modules of the electronic device 4 which are able to implement the steps of the decryption method, such as in particular a module for decrypting data and a reception module relying on the communication means 9 of the electronic device 4.

In the embodiment described here, it is supposed that each of the electronic devices 2 and 4 (and thus correlatively of the users U1 and U2) possess a pair of public and private keys written as (PKi,SKi) with i=1, 2. These keys have been generated here by each of the devices 2 and 4 respectively, by applying the following procedure, for i=1, 2:

(1) Two integers ski1, ski1 are randomly chosen by the device in the multiplicative group $\mathbb{Z}_p^* = (\mathbb{Z}/p\mathbb{Z}) \setminus \{0\}$, $\mathbb{Z}$ denoting the set of relative integers and p being a prime number.

(2) The following elements are then computed by the device:

$$pki1 = g^{ski1} \text{ and } pki2 = g^{ski2}$$

where g denotes a generator element of a group G of order p.

(3) The device then obtains:

$$SKi = (ki, ski1, ski2) \text{ where } ki = HMAC.KG(pph_{hmac})$$

and $PKi = (pki1, pki2)$ where HMAC.KG is a HMAC (keyed-Hashing for Message Authentication) further detailed below, taking as input the public parameters $pph_{hmac}$ on and returning a secret key ki. Such a function is described for example in the documented edited by the IETF (Internet Engineering Task Force) RFC 2014 titled "HMAC: Keyed-Hashing for Message Authentication".

The dimensions of the keys SKi and PKi, i=1,2, are set according to the level of security one wishes to achieve, in a manner known per se.

As mentioned previously, the invention specifically relies on the implementation at storage server level 3 of a conditional re-encryption server primitive. Moreover, to allow fine tuning of the access rights given by the user U1, a unique access condition is advantageously allocated to each file and/or folder of the tree ARB by the user U1. In the example illustrated here, this access condition is an identifier of the file and/or folder to which it is uniquely related.

An access right to a file and/or folder of the tree ARB is then given by the user U1 to a user U2 by generating a re-encryption or transition key written as rk pertaining to this file and/or folder, from the user U1 to the user U2. This re-encryption key makes it possible to convert the encrypted data (also known as "cipher") to which it is related for the user U1 into encrypted data for the user U2 that the latter can decrypt using his private key. In other words, each re-encryption key generated for the user U2 includes a condition which allows the user U2 to access the file or folder corresponding to this condition (or to all the data contained in the folder corresponding to it.)

Given that each file of the tree ARB possesses a different access condition from that of the folder in which they are included, the invention proposes a mechanism for reconditioning each file and folder gradually as they are inserted into the tree ARB in the target folder DF, making it possible to guarantee that the user U2 can properly access all the data of the tree ARB that he is authorized to access by the user U1 (in other words, all the data included in the target folder DF.)

Figure 3:
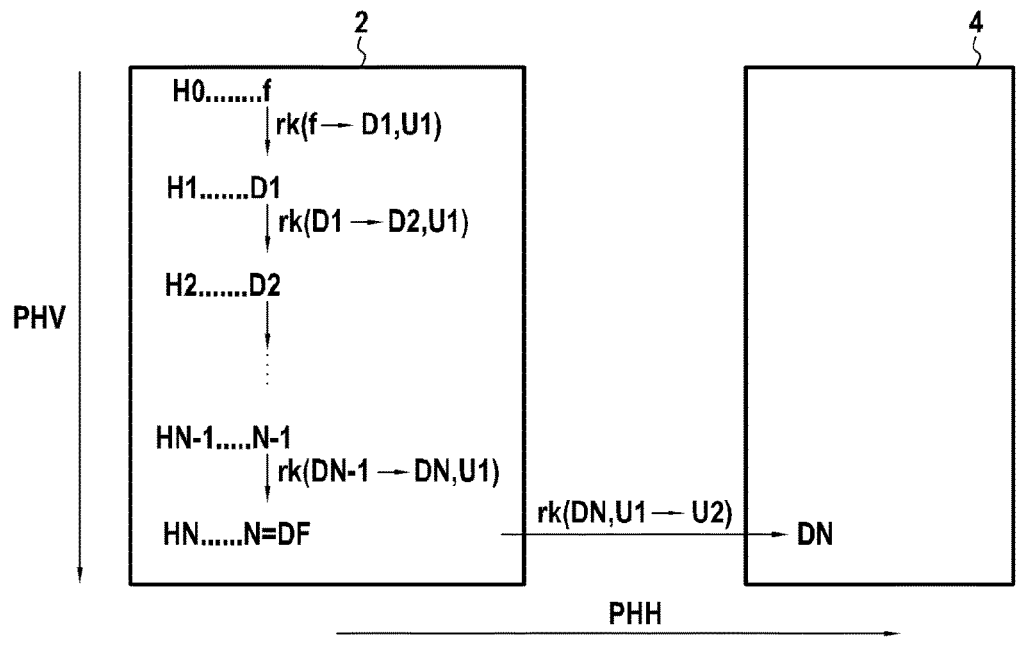
FIG. 3 schematically represents the reconditioning principle implemented by the invention through the updating, re-encryption and decryption methods according to the invention.

More precisely, the invention proposes a re-encryption (or reconditioning) in two phases, schematically illustrated in FIG. 3 for a tree ARB comprising, from the target folder DF, N+1 hierarchical levels H0, H1, HN. H0 denotes the hierarchical level of an element f (file or folder) included in the target folder DF and HN the hierarchical level of the target folder DF, each hierarchical level Hn n=1, ..., N comprising a folder Dn in which the element f is included (either indirectly by way of the folders Dn−1, Dn−2, ..., D1 or directly for the folder D1), the target folder DF denoting the folder DN of the hierarchical level HN.

This re-encryption in two phases comprises:

(1) a phase PHV of "vertical" reconditioning or re-encryption, during which re-encryption keys are created by the electronic device 2 of the user U1 in order to change the access condition pertaining to an element (file f or folder Dn) of a hierarchical level Hn into an access condition pertaining to a folder Dn+1 of the hierarchical level directly above, Hn+1, in which this element is found.

The re-encryption keys respectively written as rk(f→Dn+1, U1) for a file f and rk(Dn→Dn+1,U1) for a folder Dn, generated in this phase PHV, thus make it possible to go up the hierarchical levels H0, H1, . . . , HN in the tree ARB up to the hierarchical level HN of the target folder DF=DN.

It is important to note that during this vertical reconditioning phase PHV, there is no modification of the person capable of decrypting the file or folder in question (namely here the user U1).

Moreover, the re-encryption keys generated in this vertical reconditioning phase are one-way here and do not make it possible to go down the hierarchical levels (in other words, they do not allow a user authorized for example to access only a file f contained in a directory D2 to access the entirety of this directory by way of the generated re-encryption keys.)

(2) a phase PHH of "horizontal" re-encryption, in which the electronic device creates a re-encryption key pertaining to the target folder DF=DN, from the user U1 to the user U2. This re-encryption key is intended to allow the user U2 to access the whole contents of the target folder DF=DN (including the subfolders DN−1, . . . , D2, D1 and the file contained in the target folder).

This mechanism of re-encryption in two phases makes it possible to construct a tree of re-encryption keys which is the image of the tree ARB of files and/or folders stored at storage server 3 level. In other words, with every inclusion of a file and/or a new folder in the target folder DF of the tree or with every movement of a file and/or folder from another folder into the target folder DF, a re-encryption key pertaining to this file or this folder is created so as to make the condition pertaining to this file or this folder into a condition pertaining to a folder of a hierarchical level directly above, and this occurs until a condition is arrived at step-by-step on the target folder DF that the user U1 has authorized the user U2 to access.

It should be noted that the tree ARB can contain one or more folders at each hierarchical level, each folder being itself able to contain one or more files and/or one or more folders. No limitation is specifically attached to the configuration of the tree of the files and/or folders of the first user.

To implement this reconditioning mechanism, the invention relies on various methods, namely:
- a method for constructing or updating the tree ARB, implemented by the electronic device 2 of the user U1, and during which the aforementioned re-encryption keys are created and transmitted to the storage server 3 for each file and/or folder included in or moved into the target folder, as well as a cipher of the file where applicable;
- a re-encryption method, implemented by the storage server 3, during which the cipher of the file included in or moved into the target folder is generated from the re-encryption keys and the cipher of the file transmitted by the electronic device 2;
- a first decryption method, implemented by the electronic device of the user U1 in order to access the file included in or moved into the target folder; and
- a second decryption method, implemented by the electronic device of the user U2, in order to access the file included in or moved into the target folder.

These various methods are described with reference to FIGS. 4 to 7, in a particular embodiment. This particular embodiment relies on the use of a HMAC function and the following known encryption/decryption schemes:

Hmac Function:

In a manner known to those skilled in the art, a HMAC function is a function for providing a fingerprint of a message parameterized by a secret key using a cryptographic hash function. This fingerprint makes it possible to simultaneously verify the integrity of data and the authenticity of a message. Some examples of such a function are described as mentioned previously, in the document RFC 2014 of the IETF.

In the embodiment described here, this function is composed of three separate algorithms, which can be easily developed by those skilled in the art based on examples of functions given in the document RFC 2014:

HMAC.Init( ) this algorithm returns public parameters $pp_{hmac}$;

HMAC.KG($pp_{hmac}$): this algorithm takes as input the public parameters $pp_{hmac}$ and returns a key K; and HMAC.Hash($pp_{hmac}$, m, K): this algorithm takes as input the public parameters $pp_{hmac}$, a message m and a key K and returns a digital fingerprint h.

As a reminder, the function HMAC.KG has been used previously to generate the secret keys of the users U1 and U2.

AES (Advanced Encryption Standard) Secret-Key Encryption Scheme:

This secret-key encryption scheme relies here on the four following algorithms, which can be easily developed by those skilled in the art based on the specifications of the AES encryption scheme and are not described in detail here:

AES.Init( ) this algorithm returns the public parameters $pp_{sec}$;

AES.KG($pp_{sec}$): this algorithm takes as input the public parameters $pp_{sec}$ and returns a secret key K of size I bits;

AES.Enc($pp_{sec}$,m,K): this algorithm takes as input the public parameters $pp_{sec}$, a message m and a secret key K and returns a cipher C; and AES.Dec($pp_{sec}$,C,K): this algorithm takes as input the public parameters $pp_{sec}$, a cipher C and a secret key K and returns a decrypted message m.

El Gamal Asymmetric or Public-Key Encryption Scheme:

In the embodiment described here, the invention relies on a modified version of the El Gamal asymmetric encryption scheme, known to those skilled in the art. This modified version is based here on the four following algorithms which can be easily developed by those skilled in the art based on the specifications of the El Gamal scheme, and are not described in detail here:

ELG.Init( ): this algorithm chooses a prime number p, a group G of prime order p (the group law of which is here written multiplicatively; G is for example the set of the points of an elliptic curve), a generator g of the group G as well as a hash function H: $G \rightarrow \{0,1\}^l$ and returns the public parameters $pp_{pub}=(p,G,g,H)$, l denoting the size in bits of the space of the messages to be encrypted;

ELG.KG($pp_{pub}$): this algorithm takes as input the public parameters $pp_{pub}$ and returns a private key sk belonging to the multiplicative group $\mathbb{Z}_p^*$ and a public key $pk=g^{sk}$;

ELG.Enc($pp_{pub}$,m,K): this algorithm takes as input the public parameters $pp_{pub}$, a message m and a public key pk and returns a cipher C=(C0,C1) where C0=$pk^r$ and C1=m⊕H($g^r$) with r∈$\mathbb{Z}_p^*$; and ELG.Dec($pp_{pub}$,C,sk): this algorithm takes as input the public parameters $pp_{pub}$, a cipher C and a private key sk and returns a decrypted message m=C1⊕H(C0$^{1/sk}$).

Of course, in a variant, other secret-key and/or public-key encryption schemes can be considered in the context of the invention.

Figure 4:
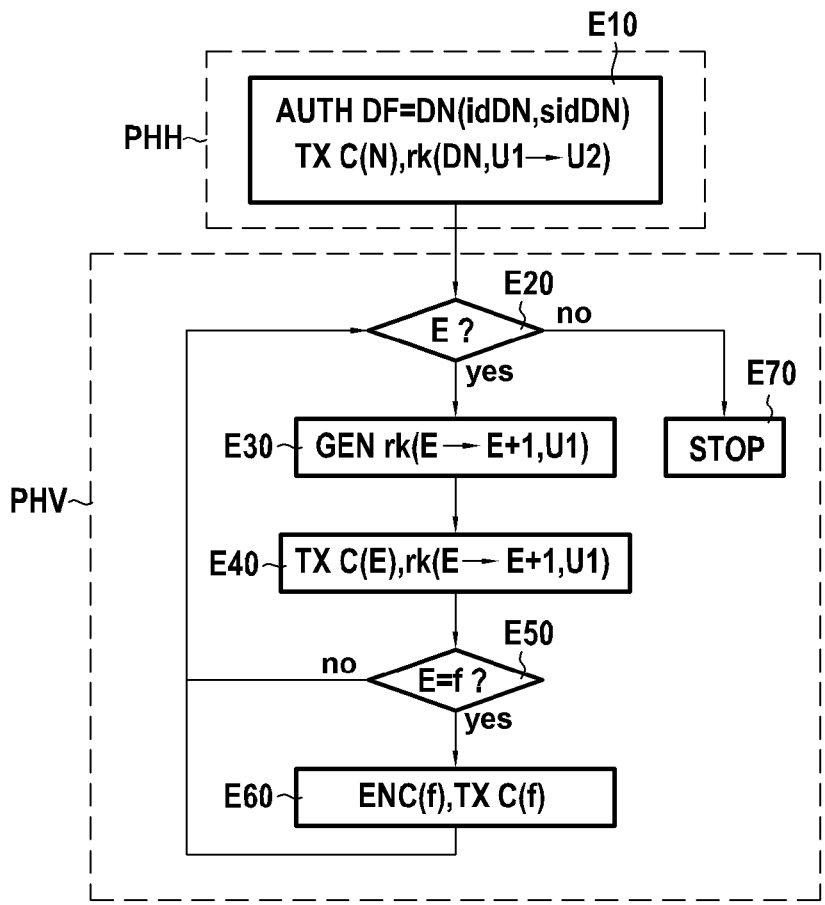
FIG. 4 illustrates in the form of a block diagram the main steps of a method for updating a file and/or folder tree according to the invention, in a particular embodiment.

FIG. 4 represents in the form of a block diagram the main steps of a method for updating or equivalently for constructing a tree ARB stored by the storage server 3, as implemented by the electronic device 2 of the user U1.

Figure 5:
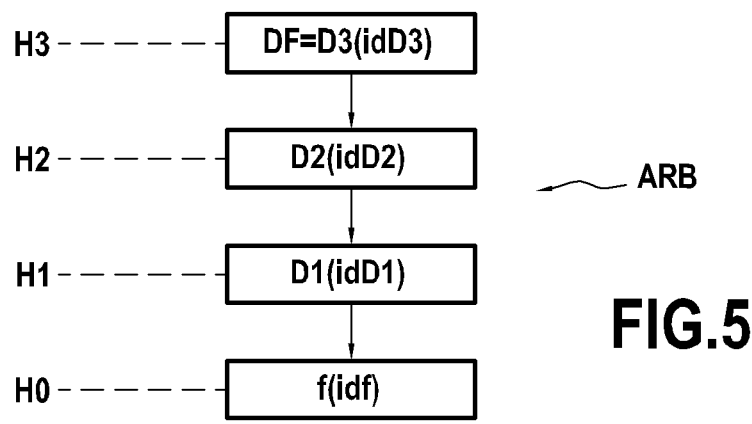
FIG. 5 represents an example of tree of files and/or folders.

To better illustrate the steps implemented, the simplified tree ARB of files/folders represented in FIG. 5 will be considered.

This tree comprises 3 folders or directories D3, D2 and D1 included in one another, and a file f included in the folder D1. These folders and file belong to four separate hierarchical levels H3, H2, H1 and H0 of the tree ARB, and are identified by a separate public identifier, written as idD3 for D3, idD2 for D2, idD1 for D1 and idf for f.

Of course, no limitation is attached to the number of hierarchical levels considered in the tree (here 4), nor to the number and type of elements present in each hierarchical level (files and/or folders.) The invention can be applied to other configurations of tree. In particular, the folder D3 can itself be included in a root folder D4 of the tree or in another folder included in the root folder. In the example envisioned here, for the sake of simplicity, it is supposed that the folder D3 is located at the root of the tree ARB.

The construction of the tree ARB is conventionally done step by step, by creating the folder D3, then the folder D2 included in D3, then the folder D1 included in D2 and finally the file f included in the folder D1. Conventionally, D3 belongs to a hierarchical level H3 directly above D2, which belongs to a hierarchical level H2 directly above D1, which itself belongs to a hierarchical level H1 directly above the file f (H0).

It is supposed here that the user U1 has granted the user U2 access rights to the target folder DF=D3. However, as mentioned previously, the target folder D3 is not necessarily located at the root of the tree of the set of files and folders of the user U1 stored by the storage server 3. The user U1 can grant access rights to any folder of the tree ARB (i.e. located at any hierarchical level of this tree.)

For this purpose, the electronic device 2 has provided the storage server 3 with a re-encryption key written as rk(D3,U1→U2) for this folder D3 from the user U1 to the user U2 (step E10). This step contributes to the "horizontal" reconditioning phase PHH mentioned previously.

The re-encryption key rk(D3,U1→U2) is generated by the electronic device 2 by implementing the following series of steps:

computation of a secret identifier sidD3 of the target folder DF=D3 from the public identifier idD3, the private key SK1 of the user U1 (or more precisely from the secret key k1 contained in the private key SK1) and the HMAC function. In the embodiment described here, the secret identifier sidD3 is determined from the HMAC function using:

$sidD3=HMAC.\text{Hash}(pp_{hmac},idD3,k1)$ the public parameters $pp_{hmac}$ having been generated using the algorithm HMAC.Init introduced previously. It should be noted that this same secret identifier sidD3 is used for computing the cipher C(D3) and as such can be computed only once;

selection of a random value v in the multiplicative group $\mathbb{Z}_p^*$;

computation of an intermediate re-encryption key rk(U1→v) from the random value v and from the private key SK1 of the user U1 (or more precisely here from the part sk12 of SK1) according to:

$rk(U1→v)=v/sk12$;

Computing, from the secret identifier sidD3, the random value v and the public key PK2 of the user U2 (or more precisely here from the part pk21 of PK2), of the pair:

$(H30,H31)=ELG.\text{Enc}(pp_{pub},sidD3.v,pk21)$; and

Construction of the re-encryption key rk(D3,U1→U2) using:

$rk(D3,U1→U2)=(rk(U1→v),H30,H31)$.

It should be noted that such a re-encryption key can be generated identically for any file and/or folder of the tree if the user U1 wishes to authorize the user U2 to access this folder and/or file.

We shall now describe how the other elements of the tree ARB are constructed by the electronic device 2 from the target folder DF=D3. For the sake of simplicity, E denotes the element of the tree under consideration. Thus, in the example envisioned in FIG. 5, E=D2, D1 or f.

For each element E included in the tree ARB in the target folder DF=D3 (yes answer to step E20), at a hierarchical level Hn (here n=0,1,2), the electronic device 2 here generates a re-encryption key rk(E→E+1,U1) for the user U1, from the element E to the folder written as E+1 that belongs to the hierarchical level directly above Hn+1 in the tree ARB and in which the element E is included. The inclusion of the element E in the tree can result either from a creation of a new element in the tree or a movement of an existing element.

In other words:

if E=D2, the electronic device 2 generates a re-encryption key for the user U1 from the element D2 belonging to the hierarchical level H2 to the folder D3 belonging to the hierarchical level H3;

if E=D1, the electronic device 2 generates a re-encryption key for the user U1 from the element D1 belonging to the hierarchical level H1 to the folder D2 belonging to the hierarchical level H2; finally if E=f, the electronic device 2 generates a re-encryption key for the user U1 from the element f belonging to the hierarchical level H0 to the folder D1 belonging to the hierarchical level H1.

The re-encryption key rk(E→E+1,U1) for the user U1, from the element E belonging to the hierarchical level Hn to the folder E+1 belonging to the hierarchical level Hn+1 is generated here by the electronic device 2 in the following sequence of steps (step E30):

computation of the secret identifiers sidE of the element E and sidE+1 of the element E+1 from, respectively, the public identifier idE, the public identifier idE+1, the private key SK1 of the user U1 (or more precisely from the secret key k1 contained in the private key SK1) and the HMAC function. In the embodiment described here:

$sidE=HMAC.\text{Hash}(pp_{hmac},idE,k1)$ $sidE+1=HMAC.\text{Hash}(pp_{hmac},idE+1,k1)$ selection of a random value vE in the multiplicative group $\mathbb{Z}_p^*$;

computation of an intermediate re-encryption key rk(U1→vE) from the random value vE and the private key SK1 of the user U1 (or more precisely here from the part sk12 of SK1) using:

$rk(U1{\rightarrow}vE)=vE/sk12;$ computation, from the secret identifier sidE of the element E, of the secret identifier sidE+1 of the element E+1, of the random value vE and the public key PK1 of the user U1 (or more precisely from the part pk12 of PK1), of the pair:

$(Hn0,Hn1)=ELG.\text{Enc}(pp_{pub},sidE.vE,pk12^{sidE+1});$ and construction of the re-encryption key rk(E→E+1,U1) using:

$rk(E{\rightarrow}E+1,U1)=(rk(U1{\rightarrow}vE),Hn0,Hn1).$

The tree ARB stored by the storage server 3 is then updated by the electronic device 2 (step E40). This updating is carried out by the electronic device 2 by providing the storage server 3 with the re-encryption key rk(E→E+1,U1) thus generated.

Furthermore, when the element E under consideration is a data file f (yes answer to step E50), a cipher C(f) of this data file is generated by the electronic device 2 for itself (i.e. it can access the plaintext file f using its private key) and the storage server 3 (step E60) is provided with it. This cipher C(f) is generated here using a hybrid encryption scheme based on the secret-key encryption algorithm and the El Gamal asymmetric encryption algorithm. As the file f can be large in size, the use of such a hybrid scheme is advantageous in order to benefit on the one hand from the functionality of public-key (or asymmetric) encryption and on the other hand from the efficiency of secret-key encryption.

More specifically, the encryption of the element f belonging to the hierarchical level Hn into a cipher C(f) is done in the following steps:

generation of a secret key Kf using the algorithm AES.KG ($pp_{sec}$), $pp_{sec}$ denoting the public parameters obtained using the algorithm AES.Init( );

encryption of the element f into a cipher Cf using: Cf=AES.Enc($pp_{sec}$,f,Kf);

computation of a secret identifier sidf of the file f from the public identifier idf, the private key SK1 of the user U1 (or more precisely here the secret key k1 included in the private key SK1) and the HMAC function. In the embodiment described here, the secret identifier idf is determined by:

$sidf=HMAC.\text{Hash}(pp_{hmac},idf,k1)$ the public parameters $pp_{hmac}$ having been generated using the algorithm HMAC.Init introduced previously;

encryption with the algorithm ELG.Enc of the secret key Kf using the public key PK1 of the user U1 (or more precisely here the part pk12 of PK1), by:

$(F00,F01)=ELG.\text{Enc}(pp_{pub},Kf,Pk12^{sidf});$ the public parameters $pp_{pub}$ having been generated using the algorithm ELG.Init introduced previously; and construction of the cipher C(f) by:

$C(f)=(Cf,F00,F01).$

In a variant, the electronic device 2 can use a public-key encryption algorithm solely to generate the cipher C(f), rather than a hybrid encryption scheme.

Steps E20 to E40, and where applicable E50 and E60, are reiterated for each element (folder or file) that the electronic device 2 wishes to include in the tree ARB stored by the storage server 3, in other words, in the example of FIG. 5, for the folders D2, D1 and the file f (step E20). These steps contribute to the "vertical" reconditioning phase mentioned previously.

The tree ARB going from the target folder D3 to the file f is therefore constructed recursively.

After the updating of the tree ARB (step E70), the storage server 3 possesses, in the example illustrated in FIG. 5:

the cipher C(f)=(Cf,F00,F01) of the file f; and the re-encryption keys: rk(D3,U1→U2), rk(D2→D3,U1), rk(D1→D3,U1), rk(f→D1,U1).

These ciphers and these re-encryption keys are for example stored in its nonvolatile memory.

It should be noted that in the embodiment described here, the electronic device 2 transmits the cipher of the file f, along with the re-encryption keys, rk(D3,U1→U2), rk(D2→D3, U1), rk(D1→D3,U1), rk(f→D1,U1), after each inclusion of an element into the tree. However, in a variant, this transmission can be done at one go, after the construction of the full tree.

The cipher of the file f transmitted by the device 2 of the user U1 is strictly speaking intended for the user U1. In other words, only the user U1 has access to the plaintext contents of this cipher using his private key SK1. No re-encryption is necessary for the user U1 since this cipher is intended for him.

Thus, the retrieval of this file f by the user U1 from the cipher C(f)=(Cf,F00,F01) stored on the storage server 3 is implemented by the electronic device 2 in the following sequence of steps:

Obtaining of the public identifier idf of the file f;

Obtaining (or computation) of the secret identifier of the file f from the public identifier idf from sidf=HMAC.Hash($pp_{hmac}$,idf,k1);

Decryption of the pair (F00,F01) into a secret key KE using the algorithm ELG.Dec, using the private key SK1 of the user U1 (or more precisely of the part s12 of SK1) and the secret identifier sidE using:

$Kf=ELG.\text{Dec}(pp_{pub},(F00,F01),s12.sidf)$

Decryption of Cf from the secret key KE to obtain the element E using:

$f=AES.\text{Dec}(pp_{sec},Cf,Kf)$

On the other hand, the cipher of the file f transmitted by the electronic device 2 of the user U1 to the storage server 3, cannot be decrypted as it is by another user than the user U1, and therefore particularly by the user U2, without knowing the private key SK1 of the user U1. To allow the user U2 to access these elements on authorization from the user U1, the storage server 3 must reencrypt the cipher of the file f using the re-encryption keys received from the electronic device 2.

Figure 6:
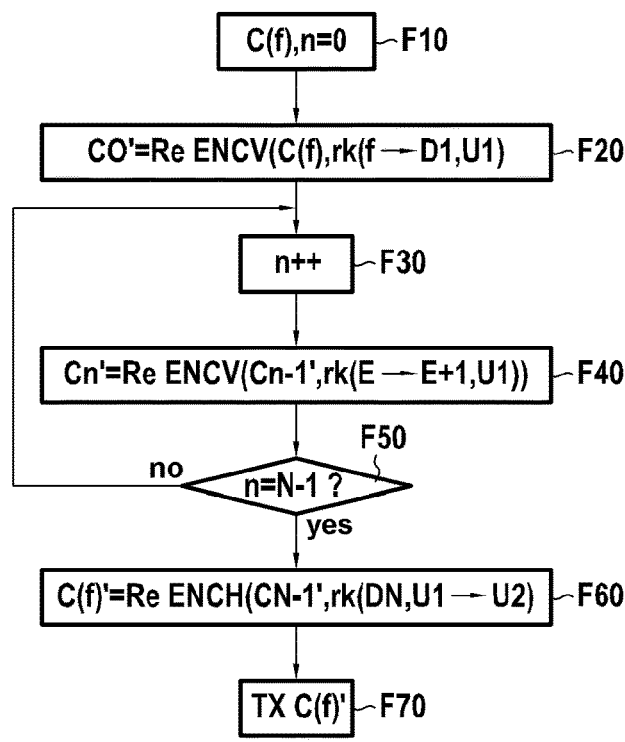
FIG. 6 illustrates in the form of a block diagram the main steps of a re-encryption method according to the invention, in a particular embodiment.

We shall now describe with reference to FIG. 6, the main steps implemented by the storage server 3 to reencrypt for the user U2 the cipher of the file f of the tree ARB transmitted by the electronic device 2 of the user U1, and thus give the electronic device 4 of the user U2 access to the target folder D3 including all the folders and files included in this target folder, namely in the example illustrated in FIG. 5 the folders D2, D1 and the file f.

This re-encryption implemented by the storage server 3 is composed of several re encryptions, the number of which depends on the height of the tree ARB envisioned between the target folder DF and the file f. These different re-encryptions are divided into two categories:

A first category of re-encryptions (forming a first step of re-encryption in the sense of the invention), which makes it possible to recondition a cipher for the public key PK1 of the user U1 pertaining to the secret condition sidE of an element E of a hierarchical level Hn of the tree into a cipher for the public key PK1 of the user U1 pertaining to the secret condition sidE+1 of the element E+1 in which the element E is directly included and which belongs to the hierarchical level Hn+1 directly above. This first category of re-encryption is applied iteratively from the cipher C(f) of the file f transmitted by the electronic device 2 to the storage server; and A second category of re-encryption (forming a second step of encryption in the sense of the invention) which makes it possible to recondition a cipher for the public key PK1 pertaining to the target folder DF into a cipher for the public key PK2 without a condition. This second encryption category is applied to the cipher obtained after the application of the first category of re-encryptions. Here it contains a single re-encryption strictly speaking.

For the sake of simplicity, in the remainder of the description we shall be limited to the single re-encryption of the cipher C(f) of the file f located at the level H0 of the tree ARB illustrated in FIG. 5. However, an identical re-encryption mechanism can be implemented for any other file of the tree, by replacing the file f by this file in the following part of the description.

The first re-encryption category relies on the re-encryption primitive (algorithm) ReENCV(C,rk(E→E+1,U1)) for an element E of hierarchical level Hn of the tree ARB, defined by the following chain of steps, where C denotes a cipher associated with the hierarchical level Hn and E+1 is an element of the hierarchical level Hn+1 directly above, including the element E:

Decomposition of the cipher C into the form:

$$C=(Cf,F00,F01,F10,F11,\ldots,Fn0,Fn1)$$

with C=(Cf,F00,F01) if n=0, and each pair (Fk0,Fk1), k=0, . . . , n being obtained from the encryption algorithm ELG.Enc (cf. updating method described previously with reference to FIG. 4);

Decomposition of the re-encryption key rk(E→E+1,U1) into:

$$rk(E\rightarrow E+1,U1)=(rk(vE\rightarrow U1),Hn0,Hn1).$$

Computation of $Fn0'=(Fn0)^{rk(vE\rightarrow U1)}$ and F(n+1)0=Hn0 and F(n+1)1=Hn1

Re-encryption of the cipher C into a cipher C' for the hierarchical level Hn using:

$$C'=(Cf,F00,F01,F10,F11,\ldots,Fn0',Fn1,F(n+1)0,F(n+1)1)$$

with C'=(Cf,F00',F01,F10,F11) for n=0.

In other words, this primitive ReENCV makes it possible to recondition a cipher C for the public key PK1 of the user U1 and the secret condition sidE of the element E (secret identifier of the element E) into a cipher C' for the public key PK1 of the user U1 and the secret condition sidE+1 of the element E+1 (secret identifier of the element E+1) directly containing the element E.

The second re-encryption category relies on the re-encryption primitive (algorithm) ReENCH(C,rk(E,U1→U2)) for an element E of the hierarchical level Hn of the tree ARB (e.g. E=DF), defined by the following chain of steps, where C denotes a cipher associated with the hierarchical level Hn:

Decomposition of the cipher C into the form:

$$C=(Cf,F00,F01,F10,F11,\ldots,Fn0,Fn1)$$

with C=(Cf,F00,F01) if n=0, and each pair (Fk0,Fk1), k=0, . . . , n being obtained from the encryption algorithm ELG.Enc (cf. updating method described previously with reference to FIG. 4);

Decomposition of the re-encryption key rk(E,U1→U2) into:

$$rk(E,U1\rightarrow U2)=(rk(vE\rightarrow U1),Hn0,Hn1).$$

Computation of $Fn0'=(Fn0)^{rk(vE\rightarrow U1)}$ and G0=Hn0 and G1=Hn1;

Re-encryption of the cipher C into a cipher C' for the user U2 using:

$$C'=(Cf,F00,F01,F10,F11,\ldots,Fn0',Fn1,G0,G1)$$

with C'=(Cf,F00',F01,G0,G1) for n=0.

In other words, this primitive ReENCH makes it possible to recondition a cipher C for the public key PK1 of the user U1 and the secret condition sidE of the element E (secret identifier of the element E) into a cipher C' for the public key PK2 of the user U2 without a condition.

The sequence of the two re-encryption categories is illustrated in FIG. 6.

From the cipher C(f)=(Cf,F00,F01) of the file f provided by the electronic device 2 (step F10), the storage server 3 generates a cipher C0' by applying the re-encryption primitive ReENCV and using the re-encryption key rk(f→D1,U1), or in other words:

$$C0'=ReENCV(C(f),rk(f\rightarrow D1,U1))$$

C0' constitutes a cipher for the hierarchical level H0.

Then, iteratively, for each hierarchical level Hn of the tree, n=1, . . . , N−1 (in the example illustrated in FIG. 5, N=3) (steps F30 and F50), the storage server 3 generates a cipher Cn' for this hierarchical level Hn by applying the re-encryption primitive ReENCV to a cipher Cn+1' generated for the hierarchical level Hn−1 and using the re-encryption key rk(E→E+1,U1) where E denotes an element of HN containing the file f and E+1 an element of Hn+1 directly containing the element E (and therefore also the file f). In other words:

$$Cn'=ReENCV(Cn-1',rk(E\rightarrow E+1,U1))$$

At the end of the N−1 iterations (yes answer to step F50), a cipher CN−1' is obtained that constitutes a first cipher of the file f in the sense of the invention. This first cipher is of the form:

$$CN-1'=(Cf,F00',F01,F10',F11,\ldots,F(N-1)0',F(N-1)1,FN0,FN1)$$

The storage server 3 then applies to the first cipher obtained the second re-encryption primitive ReENCH using the re-encryption key rk(DF=DN,U1→U2) to generate a second cipher C(f)' of the file f (step F60), or:

$$C(f)'=ReENCH(CN-1',rk(DF,U1\rightarrow U2))$$

This second cipher is of the form:

$$C(f)'=(Cf,F00',F01,F10',F11,\ldots,FN0',FN1,G0,G1)$$

This second cipher is provided to the electronic device 4 of the user U2 when the latter wishes to access the contents of the file f of the user U1 (step F70).

Figure 7:
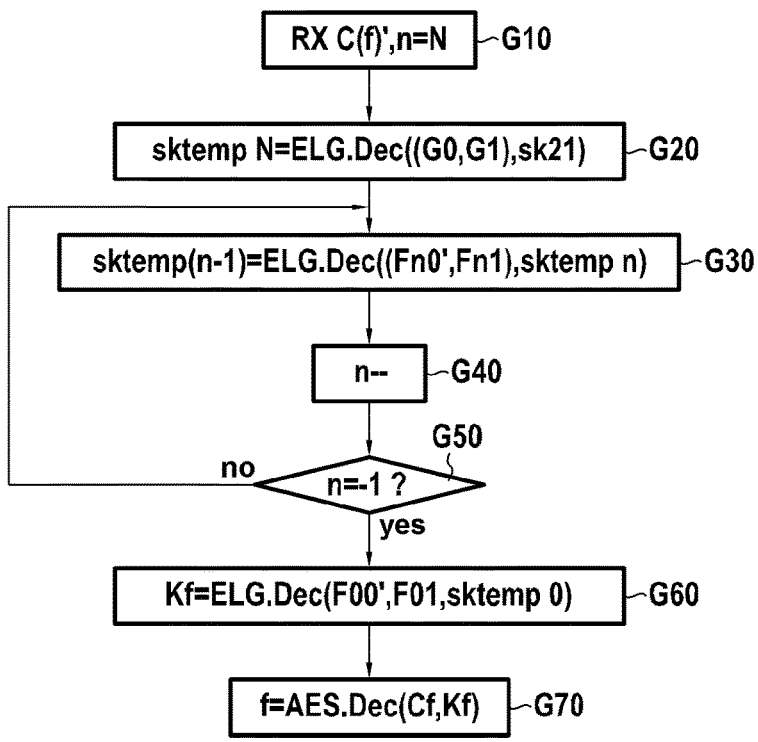
FIG. 7 illustrates in the form of a block diagram the main steps of a decryption method according to the invention, in a particular embodiment.

We shall now describe, with reference to FIG. 7, the main steps of the decryption method implemented by the electronic device 4 to access the file f of the user U1 from the cipher C(f)' provided by the storage server 3. This decryption is carried out iteratively.

More specifically, the cipher C(f)' received from the storage server 3 (step G10) is of the form:

$$C(f)'=(Cf, F00', F01, F10', F11, \ldots, FN0', FN1, G0, G1)$$

The electronic device 4 first decrypts the cipher formed by the pair (G0,G1) (step G20), with the decryption algorithm ELG.Dec and by using the private key SK2 of the user U2 (or more specifically here the part sk21 of the private key SK2). It thus generates a message sktempN according to:

$$sk\text{temp}N = ELG.Dec(pp_{pub}, (G0, G1), sk21)$$

Then, for each hierarchical level Hn of the tree ARB, from n=N down to 1 (in other words the tree ARB is travelled in the downward direction this time, from HN to H0) (steps G40 and G50), the electronic device 4 decrypts the other elements of the cipher C(f)' (step G30) using:

$$sk\text{temp}(n-1) = ELG.Dec((Fn0', Fn1), sk\text{temp}n)$$

At the end of these N iterations, the electronic device 4 decrypts the pair (F00',F01) (step G60) with the decryption algorithm ELG.Dec, using the message sktemp0 as decryption key, and thus generates a key Kf using:

$$Kf = ELG.Dec(pp_{pub}, (F00', F01), sk\text{temp}0)$$

Finally, it retrieves the file f by applying the decryption algorithm AES.Dec to the cipher Cf using the key Kf (step G70), or:

$$f = AES.Dec(pp_{sec}, Cf, Kf)$$

The user U2 thus has access to the file of the user U1.

By repeating the re-encryption and decryption methods illustrated in FIGS. 6 and 7 for each file of the folders of the tree ARB included in the target folder DF, the user U2 has access to all the files and folders contained therein.

In the examples described here, a file f included in or moved into the target folder DF is envisioned.

The inclusion of the file f into the target folder DF can in particular be due to the creation of a new file or to a copying of an existing file, extracted from another folder of the tree of files and folders of the first user. It should be noted that if a file extracted from another folder also included in the target folder is copied, this file is associated with two separate re-encryption keys.

On the other hand, moving a file from a folder of the tree of files and folders of the first user into the target folder requires the deletion of the former re-encryption key linked to the former folder in which the file was found.

The invention claimed is:

1. A method of updating, by an electronic device of a first user, of a tree of data files and/or folders of the first user stored in a storage server configured to implement a re-encryption mechanism, this tree comprising at least one target folder that the first user has authorized a second user to access by providing the storage server with a re-encryption key for this target folder from the first user to the second user, said method comprising, for each inclusion of an element in, or movement of an element into this target folder, this element being a data file or a folder:
   generating a re-encryption key for the first user from the element to a folder belonging to a hierarchical level directly above in the tree in which the element is included, this re-encryption key being generated from a secret identifier of the element, a secret identifier assigned to the folder of the hierarchical level directly above, and private and public keys of the first user;
   if said element is a data file encrypting the element using a public key of the first user and the secret identifier assigned to the element; and
   updating the tree via a process comprising providing the storage server with the re-encryption key generated for the first user and, if the element is a data file, with the cipher of this element.

2. The method according to claim 1, wherein the secret identifier assigned to the element is determined by the electronic device from a public identifier of the element and a private key of the first user.

3. The method according to claim 1, wherein:
   the secret identifier of the element is determined by applying a hash function parameterized by the private key of the first user to the public identifier of the element; and/or
   the secret identifier of the folder of the above hierarchical level is determined by applying a hash function parameterized by the private key of the first user to a public identifier assigned to this folder.

4. The method according to claim 1, wherein the encryption of the element comprises the application of a public-key encryption algorithm or a hybrid encryption algorithm relying on a public-key encryption algorithm and a secret-key encryption algorithm.

5. The method according to claim 1, wherein the re-encryption key for the first user from the element to the folder of the hierarchical level directly above is generated by applying a public-key encryption algorithm to a message obtained from the private identifier of the element, and from a temporary key derived from the private key of the first user, using the public key of the first user and the secret identifier of the folder of the hierarchical level directly above.

6. The method according to claim 1, wherein the re-encryption key from the first user to the second user is generated by applying a public-key encryption algorithm to a message obtained from a secret identifier assigned to the target folder and from the private key of the first user, using the public key of the second user.

7. A method of re-encryption, by a storage server of a tree of data files and/or folders of a first user, this tree comprising at least one target folder that the first user has authorized a second user to access, the re-encryption method comprising, for each data file included in or moved into the target folder for which a cipher has been provided to said storage server:
   a first re-encryption process resulting in a first cipher of the file and comprising:
      re-encrypting the cipher of the file provided to the storage server using a re-encryption key for the first user from this file to a folder of a hierarchical level directly above in the tree in which the file is included; and
      for each hierarchical level k of the tree, from the hierarchical level directly above it up to a hierarchical level directly below the hierarchical level of the target folder, re-encrypting resulting in a cipher for the hierarchical level k, a cipher obtained for the hierarchical level k−1, this re-encryption being implemented using a re-encryption key for the first user from a folder of the hierarchical level k to a folder of the hierarchical level k+1 in which the file is included;

the first cipher of the file corresponding to the cipher obtained for the hierarchical level directly below the hierarchical level of the target folder; and a second re-encryption process resulting in a second cipher of the file comprising a re-encryption of the first cipher with a re-encryption key for the target folder from the first user to the second user.

8. A method of decryption of a cipher of a data file of a tree of data files and/or folders of a first user, this tree comprising at least one target folder containing the file and which the first user has authorized a second user to access, this decryption method being adapted for implementation by an electronic device of the second user, the cipher of the file having been provided to said electronic device following the execution by a storage server of a method of re-encryption according to claim 7, this decryption method comprising decryption of this cipher using a private key of the second user.

9. A computer having stored thereon a program including instructions for performing the updating method according to claim 1, when said program is executed by the computer.

10. A storage medium readable by a computer, on which a computer program is stored, the computer program comprising instructions for the performing the updating method according to claim 1, when the instructions are executed by a computer.

11. An electronic device of a first user configured to update a tree of data files and/or folders of the first user stored in a storage server configured to implement a re-encryption mechanism, this tree comprising at least one target folder that the first user has authorized a second user to access by providing the storage server with a re-encryption key for this target folder from the first user to the second user, this electronic device being configured to, for each inclusion of an element in or movement of an element into this target folder, this element being a data file or a folder, perform a method of updating comprising:

generating a re-encryption key for the first user from the element to a folder belonging to a hierarchical level directly above in the tree in which the element is included, this re-encryption key being generated from a secret identifier of the element, a secret identifier assigned to the folder of the hierarchical level directly above it, and private and public keys of the first user;

encrypting the element if the element is a data file using a public key of the first user and the secret identifier assigned to the element; and updating the tree using a process comprising providing the storage server with the re-encryption key generated for the first user and, if the element is a data file, the cipher of this element.

12. A storage server of a tree of data files and/or folders of a first user, comprising at least one target folder that the first user has authorized a second user to access, the storage server being configured to perform a first and a second re-encryption process for each data file included in or moved into the target folder for which a cipher has been provided to the storage server, and wherein:

the first re-encryption process comprises generating a first cipher of the file by:

re-encrypting the cipher of the file provided to the storage server using a re-encryption key for the first user from this file to a folder of a hierarchical level directly above in the tree in which the file is included; and for each hierarchical level k of the tree, from this hierarchical level directly above it up to a hierarchical level directly below the hierarchical level of the target folder, re-encrypting resulting in a cipher for the hierarchical level k, a cipher obtained for the hierarchical level k−1, this re-encryption being implemented using a re-encryption key for the first user from a folder of the hierarchical level k to a folder of the hierarchical level k+1 in which the file is included;

the first cipher of the file corresponding to the cipher obtained for the hierarchical level directly below the hierarchical level of the target folder;

and wherein the second re-encryption process comprises generating a second cipher of the file by implementing a re-encryption of the first cipher with a re-encryption key for the target folder from the first user to the second user.

13. An electronic device configured to decrypt a cipher of a tree of data files and/or folders of a first user, this tree comprising at least one target folder containing the file and which the first user has authorized the second user to access, the cipher of the file having been provided to the electronic device by a storage server, said electronic device also configured to decrypt this cipher using a private key of the second user wherein said storage server is a storage server of a tree of data files and/or folders of a first user, comprising at least one target folder that the first user has authorized a second user to access, the storage server being configured to perform a first and a second re-encryption process for each data file included in or moved into the target folder for which a cipher has been provided to the storage server, and wherein:

the first re-encryption process comprises generating a first cipher of the file by:

re-encrypting the cipher of the file provided to the storage server using a re-encryption key for the first user from this file to a folder of a hierarchical level directly above in the tree in which the file is included; and for each hierarchical level k of the tree, from this hierarchical level directly above it up to a hierarchical level directly below the hierarchical level of the target folder, re-encrypting resulting in a cipher for the hierarchical level k, a cipher obtained for the hierarchical level k−1, this re-encryption being implemented using a re-encryption key for the first user from a folder of the hierarchical level k to a folder of the hierarchical level k+1 in which the file is included;

the first cipher of the file corresponding to the cipher obtained for the hierarchical level directly below the hierarchical level of the target folder;

and wherein the second re-encryption process comprises generating a second cipher of the file by implementing a re-encryption of the first cipher with a re-encryption key for the target folder from the first user to the second user.

14. A system comprising:

an electronic device of a first user according to claim 11;

a storage server of a tree of data files and/or folders of a first user, comprising at least one target folder that the first user has authorized a second user to access, the storage server being configured to perform a first and a second re-encryption process for each data file included in or moved into the target folder for which a cipher has been provided to the storage server, and wherein:

the first re-encryption process comprises generating a first cipher of the file by:

re-encrypting the cipher of the file provided to the storage server using a re-encryption key for the first user from this file to a folder of a hierarchical level directly above in the tree in which the file is included; and for each hierarchical level k of the tree, from this hierarchical level directly above it up to a hierarchical level directly below the hierarchical level of the target folder, re-encrypting resulting in a cipher for the hierarchical level k, a cipher obtained for the hierarchical level k−1, this re-encryption being implemented using a re-encryption key for the first user from a folder of the hierarchical level k to a folder of the hierarchical level k+1 in which the file is included;

the first cipher of the file corresponding to the cipher obtained for the hierarchical level directly below the hierarchical level of the target folder;

and wherein the second re-encryption process comprises generating a second cipher of the file by implementing a re-encryption of the first cipher with a re-encryption key for the target folder from the first user to the second user; and an electronic device of the second user configured to decrypt a cipher of a tree of data files and/or folders of a first user, this tree comprising at least one target folder containing the file and which the first user has authorized the second user to access, the cipher of the file having been provided to the electronic device by the storage server, said electronic device also configured to decrypt this cipher using a private key of the second user.

15. A computer having stored thereon a program including instructions for performing the re-encryption method according to claim 7 when said program is executed by the computer.

16. A computer having stored thereon a program including instructions for performing the decryption method according to claim 8 when said program is executed by the computer.

17. A storage medium readable by a computer, on which a computer program is stored, the computer program comprising instructions for the performing the re-encryption method according to claim 7 when the instructions are executed by a computer.

18. A storage medium readable by a computer, on which a computer program is stored, the computer program comprising instructions for the performing the decryption method according to claim 8 when the instructions are executed by a computer.

* * * * *